United States Patent [19]

Hornor et al.

[11] 4,234,019
[45] Nov. 18, 1980

[54] LUG BEAD HOSE

[75] Inventors: Harold G. Hornor, Cuyahoga Falls; Karl K. Kluss, Stow, both of Ohio

[73] Assignee: The Goodyear Tire & Rubber Company, Akron, Ohio

[21] Appl. No.: 2,911

[22] Filed: Jan. 12, 1979

[51] Int. Cl.³ .............................. F16L 11/08
[52] U.S. Cl. ............................ 138/109; 138/130; 285/149
[58] Field of Search ............... 138/109, 130, 133, 138, 138/174; 285/114, 149, 368, 400, 412

[56] References Cited

U.S. PATENT DOCUMENTS

| | | | |
|---|---|---|---|
| 1,238,921 | 9/1917 | Johannsmeyer | 138/109 X |
| 1,847,218 | 3/1932 | Lamb | 285/149 |
| 1,883,086 | 10/1932 | Swartz | 138/109 X |
| 1,939,872 | 12/1933 | Bedur | 138/109 X |
| 2,241,355 | 5/1941 | Maclochlon | 285/149 X |
| 2,277,397 | 3/1942 | Graham | 285/149 X |
| 2,298,738 | 10/1942 | Kimmich et al. | 285/149 X |
| 2,359,952 | 10/1944 | Welger | 285/368 X |
| 2,809,056 | 10/1957 | Kaiser | 285/149 |
| 2,911,236 | 11/1959 | Thibault | 138/130 X |
| 3,596,681 | 8/1971 | Elson | 138/109 |
| 3,688,802 | 9/1972 | Bauman et al. | 138/109 |
| 3,899,006 | 8/1975 | Champleboux et al. | 138/109 |
| 4,126,157 | 11/1978 | Roest | 138/109 X |
| 4,132,382 | 1/1979 | Jackson | 138/109 X |

Primary Examiner—James E. Bryant, III
Attorney, Agent, or Firm—D. M. Ronyak

[57] ABSTRACT

An improved hose having a reinforced elastomeric structure built over rigid steel bead rings at the terminal end comprises a plurality of lugs attached to the bead ring at spaced locations around the ring on a tapered outward facing surface of the ring such that loading on the flanged end of the hose may be transferred directly to the bead.

3 Claims, 2 Drawing Figures

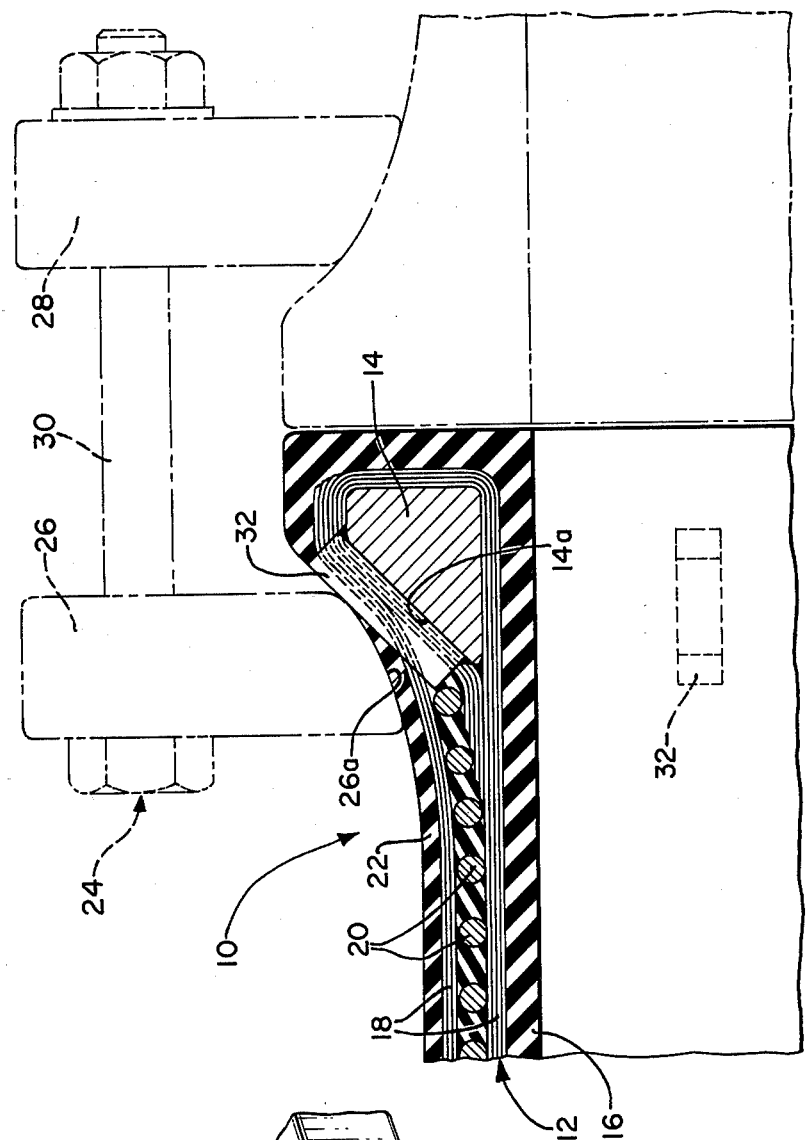
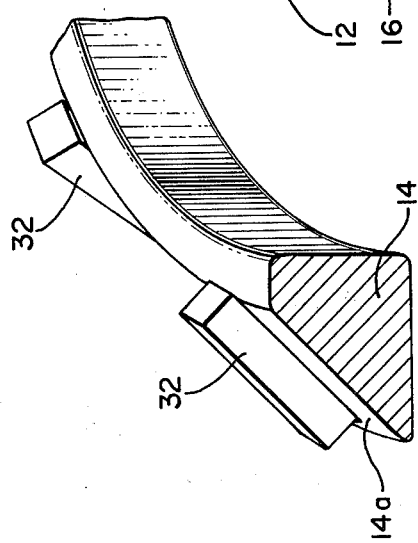
FIG. 1
FIG. 2

LUG BEAD HOSE

BACKGROUND OF THE INVENTION

This invention generally relates to hose pipes and/or conduits and more particularly to large-bore hoses as may be used in material handling applications wherein a wide range of positive and negative pressures are experienced such as for example in suction and discharge applications.

More specifically, the invention relates to an improved terminal end configuration for a full flange beaded hose of the type that is conventionally hand-built for handling abrasive, corrosives or caustic materials. These type hoses are known and used in industry and generally comprise a reinforced elastomeric structure having terminal ends built over rigid steel bead rings and supported further by malleable iron retaining rings. The retaining rings effect a bolted coupling between two abutting ends of such hose.

A principal object of the present invention therefore, is to provide an improved bead configuration for coupling terminal hose ends that increases the load carrying capacity of such couplings while also reducing damage to the hose structural elements by reason of increased end loading.

Other objects and advantages of the invention will be more fully appreciated from the following description when considered in conjunction with the accompanying drawings in which:

FIG. 1 is an elevational view, in section, showing a portion of one terminal end of hose in solid lines while a second end is shown coupled thereto via a retaining ring assembly, the latter being indicated in ghost lines; and FIG. 2 is a partial perspective view of the lug bead in accordance with this invention.

DESCRIPTION OF THE INVENTION

Referring to the drawing, a terminal end of a large bore hose is generally indicated by reference numeral 10 and conventionally comprises a reinforced elastomeric hose structure 12 built over a steel bead ring 14. The structure 12 includes an inner elastomeric liner tube 16, multiple plies of elastomer-impregnated fabric or duck reinforcing material 18, at least one wire reinforcement ply 20, and an elastomeric cover ply 22. All of these elements are bonded into an integral structure upon being subjected to a vulcanization atmosphere.

Coupling of two terminal ends together is accomplished by means of a retaining ring assembly generally indicated by ghost lines at 24. The assembly conventionally comprises rings 26,28 which may be split rings for ease of mounting on the hose 12 and which have tapered bores for adapting to the taper of the hose end in the area of the bead 14. The assembly also comprises at least one pair of bolts 30 for drawing the terminal ends together in a full flange abutting relationship. It will be appreciated that upon drawing up the retaining rings 26,28 by means of the bolts 30, that compression of the abutting flange materials takes place to effect a leak-proof seal while the retaining rings also bear against the hose structure on the outward facing surface 14a of the bead 14 to effect a compression of the hose material at that point. In this circumstance, additional end-loading on the coupling may result in damage to the hose structure and the closure integrity of the seal is compromised.

Therefore, and in accordance with this invention, the bead 14 is modified by a plurality of lugs 32 that are attached to the bead in spaced locations around the bead so as to equalize stresses imposed thereon by the retaining rings 26,28. Any number of lugs 32 may be welded to the bead so long as the loading on the bead by a retaining ring 26 is equalized around the bead. For example, any even number of lugs may be affixed at spaced opposing positions around the bead or an odd numbered group may be affixed thereto at spaced equal angular positions to gain the same equalized loading. In any event, the lugs 32 transfer loading on the ring 26 directly to the bead 14 and thus eliminates any possibility of damage to the hose plies that are positioned between the outward facing surface 14a of the bead and the inward facing surface 26a of the retaining ring.

While certain representative embodiments and details have been shown for the purpose of illustrating the invention, it will be apparent to those skilled in this art that various changes and modifications may be made therein without departing from the spirit or scope of the invention.

We claim:

1. An elastomeric hose adapted to be abutted to like hose and drawn together by external clamping means having a plurality of elastomer impregnated reinforcing plies and including a tapered flanged end which enlarges toward the end of the hose, said tapered end having a bead ring embedded therein which is enveloped by at least one of said reinforcing plies, said bead ring having an outwardly facing conical surface which tapers to a lesser dimension in a direction away from the end of the hose, at least one of said plies extending over said conical surface, said outwardly facing surface having at least two lugs projecting generally perpendicularly therefrom through those plies which extend over said conical surface such that external loading by the clamping means may occur directly on said lugs and be directly transferred to said bead ring.

2. The hose structure as set forth in claim 1 wherein an even number of lugs are affixed to the bead at spaced-opposing positions around the bead.

3. The hose structure as set forth in claim 1 wherein an odd number of lugs are affixed to the bead at spaced equal-angular positions around the bead.

* * * * *